(12) United States Patent
Aranwela et al.

(10) Patent No.: US 8,190,569 B2
(45) Date of Patent: May 29, 2012

(54) SYSTEM AND METHOD FOR SITE CLONING

(75) Inventors: Nuvan Aranwela, Ascot Vale (AU); Chris Taylor, Northcote (AU); Lucy Brown, South Melbourne (AU); John Myron, North Balwyn (AU)

(73) Assignee: Wishlist Holdings Limited, Port Melbourne (AU)

( * ) Notice: Subject to any disclaimer, the term of this patent is extended or adjusted under 35 U.S.C. 154(b) by 345 days.

(21) Appl. No.: 12/418,138

(22) Filed: Apr. 3, 2009

(65) Prior Publication Data
US 2010/0257409 A1 Oct. 7, 2010

(51) Int. Cl.
*G06F 11/36* (2006.01)
(52) U.S. Cl. ........................................ 707/634; 707/726
(58) Field of Classification Search .................. 707/10, 707/5, 610, 102, 104, 204, 3, 726, 634; 709/220, 709/217, 205
See application file for complete search history.

(56) References Cited

U.S. PATENT DOCUMENTS

| | | | |
|---|---|---|---|
| 6,889,229 B1 * | 5/2005 | Wong et al. | 707/610 |
| 7,206,827 B2 * | 4/2007 | Viswanath et al. | 709/220 |
| 7,392,268 B2 * | 6/2008 | Hardman et al. | 1/1 |
| 8,037,064 B2 * | 10/2011 | Song et al. | 707/726 |
| 2002/0069204 A1 * | 6/2002 | Kahn et al. | 707/10 |
| 2003/0217076 A1 * | 11/2003 | Heptinstall et al. | 707/104.1 |
| 2004/0221289 A1 * | 11/2004 | D'Souza et al. | 718/102 |
| 2006/0253458 A1 * | 11/2006 | Dixon et al. | 707/10 |
| 2006/0253582 A1 | 11/2006 | Dixon et al. | |
| 2007/0208778 A1 * | 9/2007 | Altounian et al. | 707/104.1 |
| 2007/0288434 A1 | 12/2007 | Cohn et al. | |
| 2008/0065649 A1 * | 3/2008 | Smiler | 707/10 |
| 2008/0071929 A1 * | 3/2008 | Motte et al. | 709/246 |
| 2008/0086545 A1 * | 4/2008 | Fatt et al. | 709/220 |
| 2008/0155006 A1 | 6/2008 | Franklin et al. | |
| 2008/0243797 A1 * | 10/2008 | Song et al. | 707/3 |
| 2008/0250310 A1 * | 10/2008 | Chen et al. | 715/234 |
| 2009/0259650 A1 * | 10/2009 | Schuil | 707/5 |
| 2010/0095197 A1 * | 4/2010 | Klevenz et al. | 715/234 |
| 2011/0029854 A1 * | 2/2011 | Nashi et al. | 715/229 |

FOREIGN PATENT DOCUMENTS

WO 2010115205 10/2010

OTHER PUBLICATIONS

Aversano, L. et al, "Web Site Evolution", pp. 107-111, Nov. 10, 2001, Proceedings, 3rd International Workshop, IEEE 2001, ISBN 0-7695-1399-9.
International Patent Application PCT/US10/29989, International Search Report and Written Opinion, mailed Nov. 2, 2010.

* cited by examiner

*Primary Examiner* — James Trujillo
*Assistant Examiner* — Thong Vu
(74) *Attorney, Agent, or Firm* — Greenberg, Traurig, LLP

(57) ABSTRACT

A system and computer implemented method comprises: (a) receiving, via a computing device, configuration data comprising unique settings and areas to clone from a site cloning page of a base site; (b) pulling all content to be cloned that is located from at least one database based on the configuration data; (c) creating a new site having a framework, the framework comprising site structure and being initially empty; and (d) copying the content from the at least one database into the framework of the new site to create a site clone of the base site customized with the configuration data.

19 Claims, 7 Drawing Sheets

Inspire & motivate people, everyday. — 234 https://a2.accumulate.com.au/sitezero/ — 235

You are currently logged in as: Client Services accumulate

Back to site | Impersonate | Logout

| Home | Site Settings | Catalogue | Members/Groups | Points Upload | Communications & Content | Reports |

Client Name: [Client name] — 202
URL: [SITE URL] — 204
CS name: [Contact Name] — 206
CS email: [contact@accumulate.co.au] — 208
Admin name: [Client Name] — 210
Admin email: [admin@client.com.au] — 212
Program name: [Program Name] — 214
IP address restriction: [ ] — 216
Country: [1] — 218
Language (CultureId): [1] — 220
Currency: [1] — 222
Time zone: [(GMT 10:00:00) E. Australia Standard Time ▽] — 224
Corporate account: [Client Account] — 226
Site timeout: [60] — 228
Contract signed: [ ] — 230

[Clone] — 232

SYSTEM AND METHOD FOR SITE CLONING

FIELD OF THE INVENTION

The present invention relates generally to point-based reward and recognition applications which can be accessed online via websites or sites, and more particularly to systems and methods for site cloning.

BACKGROUND

A reward and recognition application can be used, for example, by an organization such as a company, a retailer or a website to award members or users that belong to, participate in or interact with the organization. For instance, managers of a company can award employees through a reward and recognition portal by means of a point-based system. In other words, employees are able to accumulate rewarded points through the reward and recognition portal in order to later redeem them for a number of different rewards. As a result, the reward and recognition application can be used to motivate, recognize, incentivise, and reward employees, increase employee retention, interest, attraction and satisfaction, strengthen organizational culture and company values and also improve employee productivity.

SUMMARY

A system and computer implemented method comprises: (a) receiving, via a computing device, configuration data comprising unique settings and areas to clone from a site cloning page of a base site; (b) pulling all content to be cloned that is located from at least one database based on the configuration data; (c) creating a new site having a framework, the framework comprising site structure and being initially empty; and (d) copying the content from the at least one database into the framework of the new site to create a site clone of the base site customized with the configuration data.

A computer readable medium having stored thereon a set of instructions which when executed, perform a method comprising: (a) receiving, via a computing device, configuration data comprising unique settings and areas to clone from a site cloning page of a base site; (b) pulling all content to be cloned that is located from at least one database based on the configuration data; (c) creating a new site having a framework, the framework comprising site structure and being initially empty; and (d) copying the content from the at least one database into the framework of the new site to create a site clone of the base site customized with the configuration data.

A computer system comprising at least one server configured for: (a) receiving, via a computing device, configuration data comprising unique settings and areas to clone from a site cloning page of a base site; (b) pulling all content to be cloned that is located from at least one database based on the configuration data; (c) creating a new site having a framework, the framework comprising site structure and being initially empty; and (d) copying the content from the at least one database into the framework of the new site to create a site clone of the base site customized with the configuration data.

Many other features and embodiments of the present invention will be apparent from the accompanying drawings and from the following detailed description.

BRIEF DESCRIPTION OF THE DRAWINGS

FIG. 2A illustrates a screenshot of a Site Cloning page with fields filled in with dummy placeholder data, according to an embodiment of the present invention.

To allow cross-referencing among the figures, like elements in the figures are provided like reference numerals.

DETAILED DESCRIPTION

Figure 1:
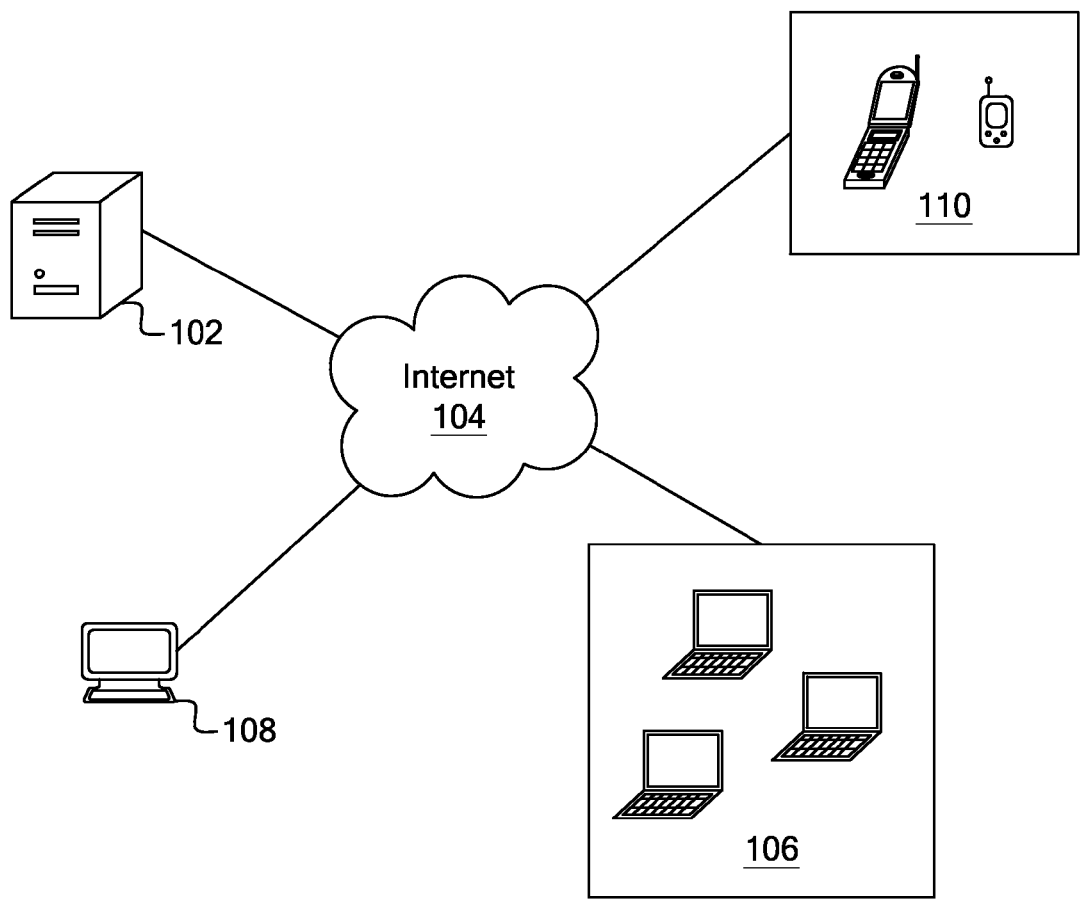
FIG. 1 illustrates a server connected to at least one computer through a network, wherein the server stores software according to an embodiment of the present invention.

In the following description, for purposes of explanation, numerous specific details are set forth in order to provide a thorough understanding of the description. It will be apparent, however, to one skilled in the art that embodiments of the present invention can be practiced without these specific details. In some instances, structures and devices are shown in block diagram form in order to avoid obscuring the description. In other instances, functional block diagrams are shown to represent data and logic flows.

Reference in this specification to "one embodiment", "an embodiment", "other embodiments", or the like means that a particular feature, structure, or characteristic described in connection with the embodiment is included in at least one embodiment of the present invention. The appearances of, for example, the phrase "in one embodiment" in various places in the specification are not necessarily all referring to the same embodiment, nor are separate or alternative embodiments mutually exclusive of other embodiments.

Moreover, whether or not there is express reference to an "embodiment" or the like, various features are described which may be exhibited by some embodiments and not by others. Similarly, various requirements are described which may be requirements for some embodiments but not other embodiments.

In accordance with the present invention, a reward and recognition portal can be used, for example, by an organization such as a company, a retailer or a website to award members or users that belong to, participate in or interact with the organization. For instance, managers of a company can award employees through a reward and recognition portal by means of a point-based system. In other words, employees can accumulate rewarded points through the reward and recognition portal to later redeem for a number of different rewards.

One embodiment of a reward and recognition portal in accordance with the present invention is a website that is accessible online via an Internet browser. The application framework of a reward and recognition portal supports the virtualization of websites. In other words, many websites can run independently from one another on one underlying "website" at the web server level. This functionality is achieved through a layer of the application that interrogates uniform resource locator (URL) requests to a given website and resolves them to the actual website requested based on a virtual subfolder supplied in the URL. All the configuration settings and content for the requested website is stored in a relational database and the necessary settings are retrieved based on the resolved website and the resulting page requested. The subfolder portion of the URL is then stripped from the request and URL rewriting technology is then used to rewrite the request to the appropriate physical page. Virtual page technology is also used to allow users to create their own pages within the system. These pages are made up of web part zones which are customizable and control site layout. Also comprising the pages are web parts within these web part zones that enable the creation of content or functional pages depending on which specific web parts are used.

The virtual nature and site configuration storage methods of the application framework for the reward and recognition portal bring rise to a unique way to create a brand new website (or "site") as a copy of another. "Site Cloning" essentially takes an existing site and creates a new site using any given existing site as a template. A minimal amount of information that is unique to the new site, such as the new virtual subfolder location and basic site details, are supplied at the time of cloning through an easy-to-use user interface (UI). The UI also allows users to select options as to which specific areas of the existing site configuration are to be included or excluded in the new site. On submission, the system reads in the configuration of the existing site, creates a new site with the unique data supplied and uses the loaded configuration to initialize the site. Each area of the existing site elected for cloning follows the process of copying the data for configuration, pages, roles, content (including images, flash, PDF, etc.), navigation, headers and footers. The actual cloning process occurs mainly in the database layer with some interaction with the application layer and a minor amount of file system work. At the conclusion of this very simple and quick process, a totally independent site is available to be customized to meet any new demands or needs.

In summary, site cloning occurs as follows:
Logging into the site-to-be-cloned and accessing the site cloning page (of the site-to-be-cloned) with permission credentials;
Selecting configuration data comprising unique settings and optional areas to clone for the site to be cloned and submitting the configuration data;
Having the site cloning system identify all of the areas in its databases that are required to be cloned based on the submitted configuration data;
Creating a new site within the databases of the site cloning system and duplicating identified foundational framework into the new site;
Copying the content to the new site's foundational framework and identifying any file system content required; and
Navigating to the new site on a chosen virtual subfolder.

Thus, provided are apparatuses and methods to clone an entire website without having to replicate an entire code base. The process is facilitated because it is tied to the virtual architecture of the application framework for a reward and recognition portal, thus enabling the replicating of a website with no replication of code. Thus, the present invention does not involve replicating at the code base level, and therefore does not result in businesses having to manage an ever increasing number of codebases, and enables the rapid deployment of websites or other Internet solutions using existing websites without having to use developers, which saves significant amounts of time and money and is more cost-effective, because dependence on developers is often a huge bottleneck for businesses. Finally, a convenient and easy-to-use front end UI enables a user to clone a website with a simple click of a button, the process taking place in just a few seconds, as opposed to more than a day if a developer was hired to copy the codebase of a website from scratch. Therefore, as can be appreciated by a person skilled in the art, Site Cloning enables the quick, convenient and cost-effective cloning of entire websites without having to replicate entire code bases or rely on developers.

The above-mentioned features and objects of the present invention will become more apparent with reference to the following description taken in conjunction with the accompanying drawings wherein like reference numerals denote like elements.

FIG. 1 illustrates a server connected to at least one computer through a network, wherein the server stores software according to an embodiment of the present invention. Software or program code directed to functions and data structures which can be used in, for example, a reward and recognition portal to clone entire websites without duplicating entire codebases and having to rely on bottleneck-inducing developers are stored on and tied to remote server 102. Remote server 102 is connected to the Internet 104, and the Internet 104 is in turn connected to at least one computer 108 by a direct connection, to at least one mobile computer 106 via a wireless connection or a direct connection, and to at least one cellular phone or mobile device 110, the cellular phones and mobile devices being configured to receive Wireless Application Protocol (WAP) or internet-based content.

Figure 1A:
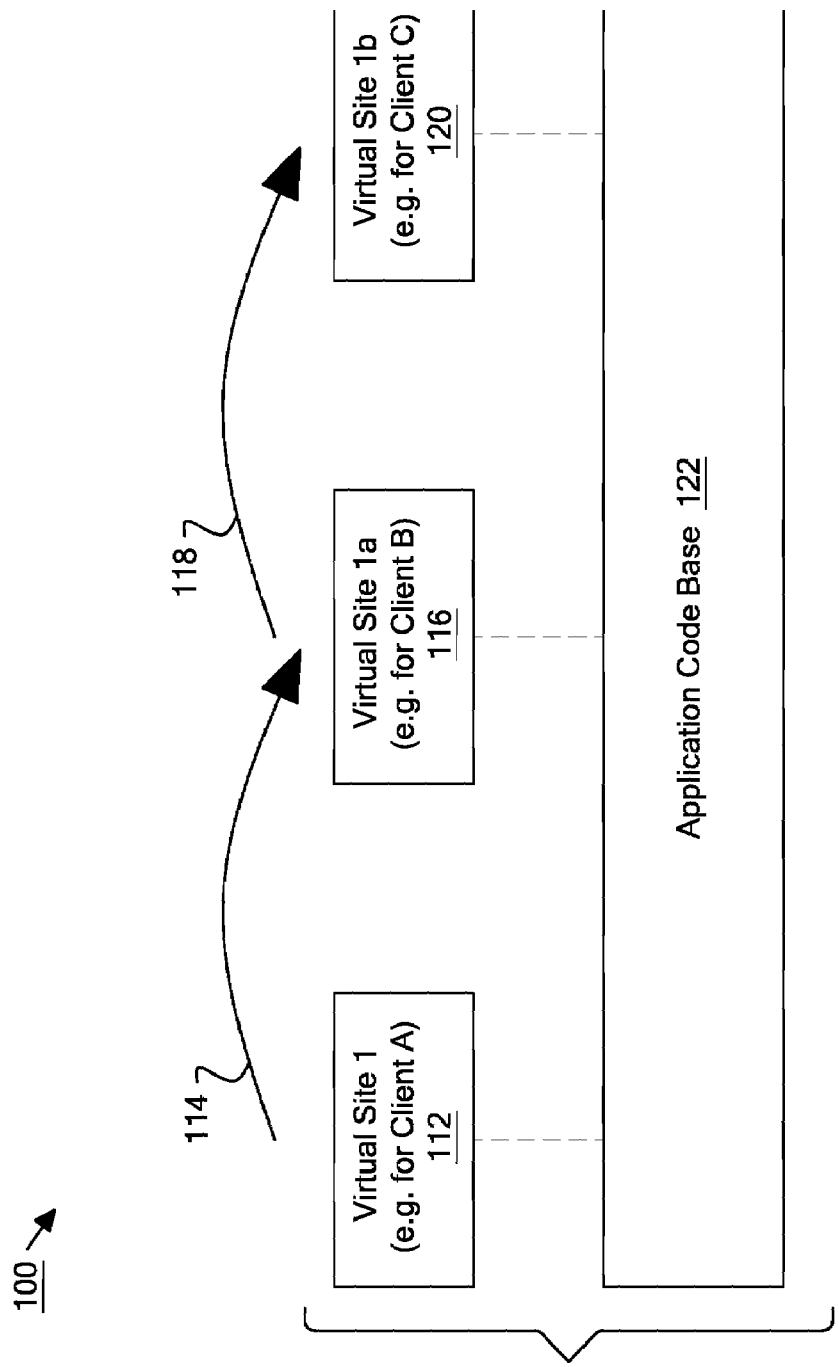
FIG. 1A illustrates the virtual architecture of the application framework for a reward and recognition portal, according to an embodiment of the present invention.

FIG. 1A illustrates the virtual architecture of the application framework for a reward and recognition portal, according to an embodiment of the present invention. Virtual architecture 100 shows Virtual Site 1 (e.g. for Client A) 112, Virtual Site 1a (e.g. for Client B) 116, and Virtual Site 1b (e.g. for Client C) 120, interfacing with application code base 122. First duplication flow 114 shows the copying of settings and content from Virtual Site 1 112 to Virtual Site 1a 116, and second duplication flow 118 shows the copying of settings and content from Virtual Site 1a 116 to Virtual Site 1b 120. Application code base 122 comprises a virtual architecture that supports the virtualization of websites. The application code base 122 has a layer that interrogates URL requests to a given website and resolves them to the actual website requested based on a virtual subfolder supplied in the URL. All the configuration settings and content for the requested website is stored in a relational database and the necessary settings are retrieved based on the resolved website and the resulting page requested. The application code base 122 comprises, for example, C# ASP.NET using SQL Server 2005 for relational data storage. The application code base 122 also comprises layers such as an User Interface (UI) layer, a presenter layer, a controller layer, a services layer, a data layer, a framework layer, a personalization layer, a testing layer, and a controls layer. The application code base 122 also comprises functions mentioned elsewhere in the Specification. Other code, software or applications used in and comprising application code base 122 will be further detailed below.

Therefore, application code base 122 enables the rapid replication of virtual sites without having to duplicate multiple code bases, because application code base 122 serves as one common code base for all of the virtual sites (the virtual sites shown here as 112, 116 and 120 but can be as many virtual sites as desired). Thus, duplicate code bases do not need to be copied because multiple virtual sites are copied from one common code base instead (application code base 122), each virtual site having their own parameters and settings to customize. A simple example to facilitate understanding of the application code base 122 is to view the application code base 122 as a central computer, and to view the various settings and content to be used for a virtual site as folders stored in the central computer. Thus, to clone websites or to make copies of virtual sites, only replica copies of the folders storing settings and content need to be cloned, thereby eliminating the need to make multiple copies of the central computer.

Finally, application code base 122 is a single body of code and can be delivered through the Internet to a user. The user then views the manifestations of the application code base 122 by browsing the virtual sites that have been created from the application code base 122. Each virtual site is either a copy of the settings and content of another virtual site or a copy of the base settings and content inherent in the application code base 122. For instance, Virtual Site 1 112 is made for Client A, with settings and content changed from the original settings and content in application code base 122 in order to fit Client A. Within the settings and content of original application code base 122 is a "site zero" containing a basic website with default settings. The site zero acts almost like a "seed" or a base of foundational groundwork used to clone any first client site, and additional new sites can be created by cloning either site zero or another existing site clone that has already been created. Virtual Site 1a 116 is made for Client B, with settings and content changed to fit Client B. It is quicker and more convenient to clone Virtual Site 1a 116 from Virtual Site 1 112 by tweaking existing parameters from Virtual Site 1 112 to fit parameters for Virtual Site 1a 116, as shown by first duplication flow 114, but a brand new Virtual Site 1a 116 can also be created from scratch using the application code base 122, if desired, using the site zero methodology discussed above. Finally, Virtual Site 1b is made for Client C, with settings and content changed to fit Client C. It is quicker and more convenient to clone Virtual Site 1b 120 from Virtual Site 1a 116 by tweaking existing parameters from Virtual Site 1a 116 to fit parameters for Virtual Site 1b 120, as shown by second duplication flow 118, but a brand new Virtual Site 1b 120 can also be created from scratch using the application code base 122, if desired, using the site zero methodology discussed above. Thus, cloning a website simply creates new, independent virtual sites or site clones using established sites as templates by tweaking the settings and content of established sites to fit the customization needs and parameters of a particular client. Essentially, virtual sites serve as "templates" from current clients which are then tailored and modified into other virtual sites that meet the specific demands of other current or future clients. As a result, this cloning process presents a fast, scalable way of creating new virtual sites from existing virtual sites without having to duplicate entire codebases or rely on any developers.

FIG. 2A illustrates a screenshot of a Site Cloning page with fields filled in with dummy placeholder data, according to an embodiment of the present invention. Placeholder Site Cloning page 200 is a simple, easy-to-use UI for cloning a virtual site or website showing a Client Name field 202, an URL field 204, a Client Services (CS) name field 206, a CS email field 208, an Admin name field 210, an Admin email field 212, a Program name field 214, an IP address restriction field 216, a Country field 218, a Language-culture field 220, a Currency field 222, a Time zone pull-down menu 224, a Corporate account field 226, a Site timeout field 228, a Contract signed checkbox 230 and a Clone button 232.

Client Name field 202 is where the name of the client of the to-be-cloned virtual site is to be filled in, here the dummy placeholder value of "Client name" is provided. URL field 204 is where the specific URL or Uniform Resource Locator (http:// . . . ) is filled in: as a result, the to-be-cloned virtual site will take this URL and the to-be-cloned virtual site will then be accessible at the URL presented in the URL field 204. Here, the dummy placeholder value of "SITE URL" is provided. If the UI for the Placeholder Site Cloning page 200 is set-up so that a pre-typed in URL is used (e.g. "http://www-.mysite.com"), then the user may only be prompted to fill in a word that would function as some sort of identifier to append to the end of the URL, e.g. "ClientA" for "http://www.mysite.com/ClientA"). However, the way that a URL is entered into URL field 204 is not limited to these above forms, and can comprise any form that identifies a given website (e.g. entering IP addresses or subfolders of existing intranet URLs, etc.). CS name field 206 is where the name of the main client contact for the to-be-cloned virtual site is filled in, here the dummy placeholder value of "Contact Name" is provided. CS email field 208 is where the email of the main client contact for the to-be-cloned virtual site is filled in, here the dummy placeholder value of "contact@accumulate.co.au" is provided. The Client Services fields (CS name field 206 and CS email field 208) basically provides the contact information of a Client Service representative that will resolve support issues for a given client. Since each client has a potentially different Client Services representative supporting them, the Client Services fields allow different clients to enter different Client Services data. Admin name field 210 is where the name of the administrator of the to-be-cloned site is to be filled in, here the dummy placeholder value of "Client Name" is provided. Admin email field 212 is where the email of the administrator of the to-be-cloned virtual site is to be filled in, here the dummy placeholder value of "admin@client.com.au" is provided.

Program name field 214 is where the type of program to be used in the to-be-cloned virtual site is filled in, for example a specific program within the programs available in a reward and recognition portal; here, the dummy placeholder value of "Program Name" is provided. Programs are individual reward and recognition programs used by individual clients. For instance, a client may run a sales incentive program through the reward and recognition portal software and call it "Strive". Hence, if "Strive" is entered into the Program name field 214, then "Strive" will appear on the cloned website for the client wherever the "Program Name" is referenced. IP address restriction field 216 is where any IP address restrictions, if any, for the to-be-cloned virtual site are filled in; here no IP address restrictions are provided so the IP address restriction field 216 is left blank. An IP address is a specific locality or server from which a website can be accessed from. An IP address restriction only enables a website to be accessed from a specific IP address or locality/server. For instance, a client may wish for a certain program to be accessible only from their offices, rather than being generally accessible to the public at large. In such a scenario, the client would specify an IP address restriction in the IP address restriction field 216 (e.g. if the client only wanted their program accessible from their offices, the client would denote the IP addresses of the office servers in which the program participants access the web from their offices) and the client's cloned site would be accordingly provided the requested limited access.

Country field 218 is where a numerical identifier corresponding to a given country used for the to-be-cloned virtual site is provided, here the dummy placeholder value of "1" is provided. Language-culture field 220 is where either a language code or a CultureID code is placed in a field, wherein the code is a numerical identifier corresponding to a given language or CultureID to be used for the to-be-cloned virtual site, with the dummy placeholder value of "1" provided here just as an example. Currency field 222 is where a numerical identifier corresponding to a given currency code to be used for the to-be-cloned virtual site is provided, here the dummy placeholder value of "1" is provided. However, the value of "1" or other numerical values have been provided for illustrative purposes only. Values such as, for example, "En" English, "En—USA" (for USA English) or "Fr" for French, may be used for language-culture field 220, and other values such as, for example, "UK" for United Kingdom pounds, "US" for US dollars, or "EU" for Euro can be used for currency field 222.

Time zone pull-down menu 224 allows a specific time zone to be selected that will be used for the to-be-cloned virtual site, here the dummy placeholder time of "(GMT 10:00:00) E. Australia Standard Time" has been selected. Corporate account field 226 is where the type of "corporate account" to be used for the to-be-cloned virtual site is filled in, here the dummy placeholder value of "Client Account" is provided. A corporate account corresponds to a client's account for invoicing and billing purposes in a reward and recognition portal. Site timeout field 228 is where the amount of time (in minutes) to wait for before automatically logging out of the to-be-cloned virtual site is filled in, here the dummy placeholder value of "50" (in minutes) is provided. Contract signed checkbox 230 enables the selection (by checking) or non-selection (by leaving un-checked) of a signed contract feature or electronic signature verification capability. Finally, Clone button 232, when pushed, takes all the settings provided in the above fields (202 to 230) and generates a cloned virtual site with those exact settings. Furthermore, current site URL 234 shows the current site where Placeholder Site Cloning page 200 is being accessed from after logging in with permission credentials, shown in permission credential status box 235 as "You are currently logged in as: Client Services". Therefore, the to-be-cloned virtual site will be created based on the settings and content implicit in the site URL shown in current site URL 234 (here, "https://a2.accuulate.com/au/sitezero/"). The functionality of creating virtual sites from other virtual sites was explained in detail in FIG. 1A, for example in first duplication flow 114 and second duplication flow 118. However, Placeholder Site Cloning page 200 or a similar looking page can also be used to create a virtual site from scratch from the application code base 122 with the site zero methodology discussed above, even though cloning virtual sites from other existing virtual sites is the more convenient and preferred approach. Thus, with a simple click of a button, a brand new replica copy of a virtual site can be created with specifically tailored settings without having to duplicate any codebases or rely on any bottleneck-inducing developers.

Figure 2B:
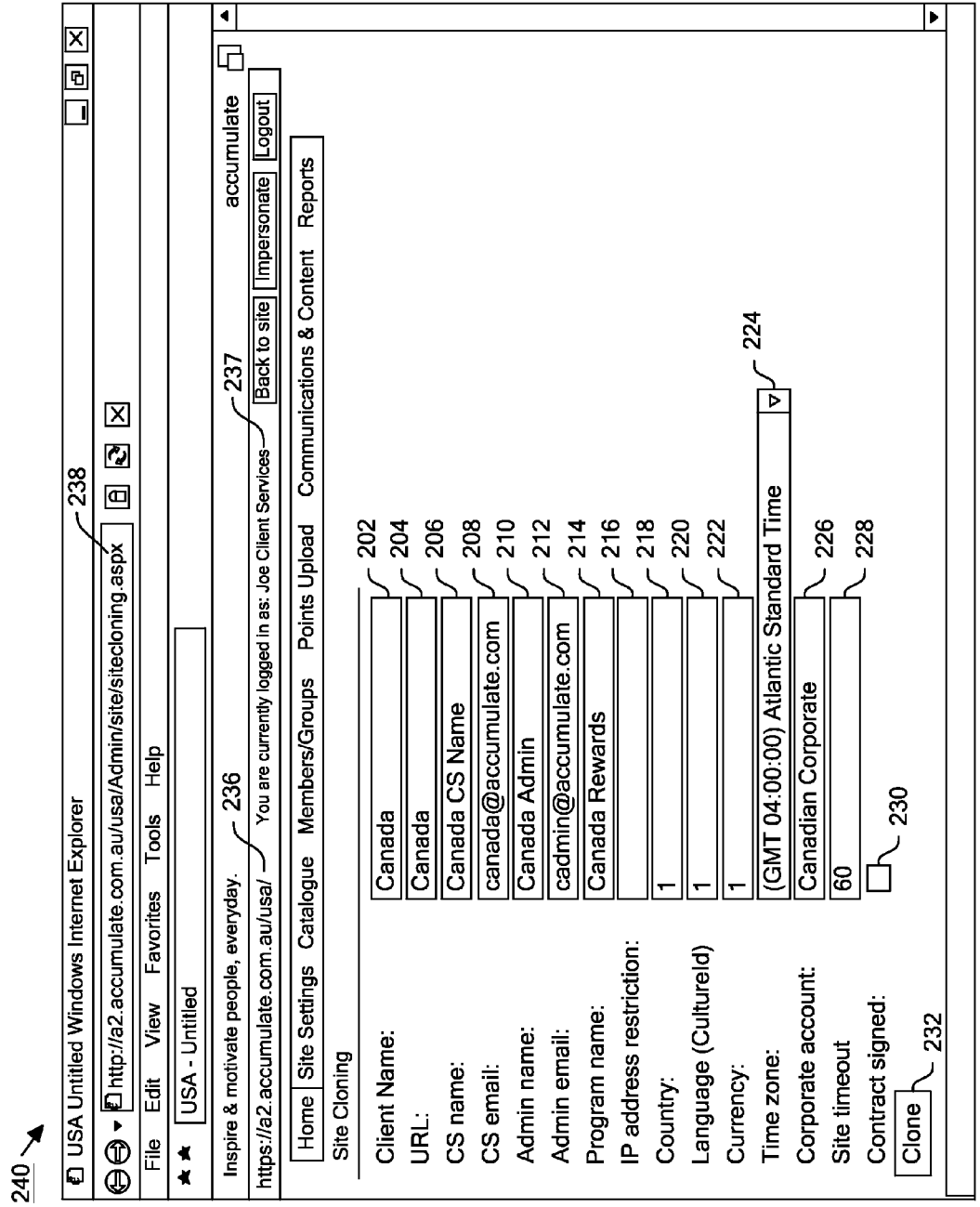
FIG. 2B illustrates a screenshot of a Site Cloning page with fields filled in with detailed site cloning data, according to an embodiment of the present invention.

FIG. 2B illustrates a screenshot of a Site Cloning page with fields filled in with detailed site cloning data, according to an embodiment of the present invention. Example Canada Client Site Cloning page 240 shows the simple, easy-to-use UI for cloning a virtual site or a website for an example client, "Canada", with all the relevant fields already filled in. The same exact fields discussed above in FIG. 2A are used in FIG. 2B, so a redundant description will not be repeated here. The main differences between FIG. 2A and FIG. 2B are the different values provided for the fields. For instance, the value "Canada" is provided for Client Name field 202, the value "Canada" is provided for URL field 204 (which can represent a major URL with Canada appended at the end, for instance, "https://a2.accumulate.com.au/canada" as shown in FIG. 4), the value "Canada CS Name" is provided for CS name field 206, the value "canada@accumulate.com" is provided for CS email field 208, the value "Canada Admin" is provided for Admin name field 210, the value "cadmin@accumulate.com" is provided for Admin email field 212, the value "Canada Rewards" is provided for Program name field 214, the IP address restriction field 216 is left blank, the numerical value of "1" is provided for the Country field 218, the Language-culture field 220 and the Currency field 222, the value "(GMT-04:00:00) Atlantic Standard Time" is selected for Time zone pull-down menu 224, the value "Canadian Corporate" is provided for Corporate account field 226, the value of "50" (representing 50 minutes) is provided for the Site timeout field 228, and the Contract signed checkbox 230 is left un-checked. Therefore, if the Clone button 232 is pushed, a new cloned virtual site will be created for the client "Canada", similar to the page shown in FIG. 4. Finally, current site URL for USA Base Page 236, shown in FIG. 2B as "https://a2.accumulate.com.au/usa" is the current "USA" site which the "Canada" virtual site clone will be based from. In other words, the Example Canada Client Site Cloning page 240 was accessed from the USA page, specifically from the Site Cloning URL Within USA Base Page 238, specifically the URL at: "https://a2.accumulate.com.au/usa/Admin/site/sitecloning.aspx", in order to make a virtual site clone (for the client "Canada") from the USA page, the functionality behind cloning virtual sites from other virtual sites described above for FIG. 1. Also the URL in 238 can only be accessed after providing appropriate permission credentials, shown in permission credentials status box 237 as "You are currently logged in as: Joe Client Services". Thus, all the settings and content from the original "USA" page (shown, for example, in FIG. 3) will be tweaked and modified according to the parameters provided in fields 202 to 230 in order to create the new "Canada" virtual site clone (shown, for example, in FIG. 4). Therefore, as can be seen with this concrete "USA" to "Canada" example, the cloning of another virtual site with specifically tailored settings can be achieved quickly, easily and conveniently with a simple click of a button without having to duplicate any codebases or rely on any bottleneck-inducing developers.

Figure 3:
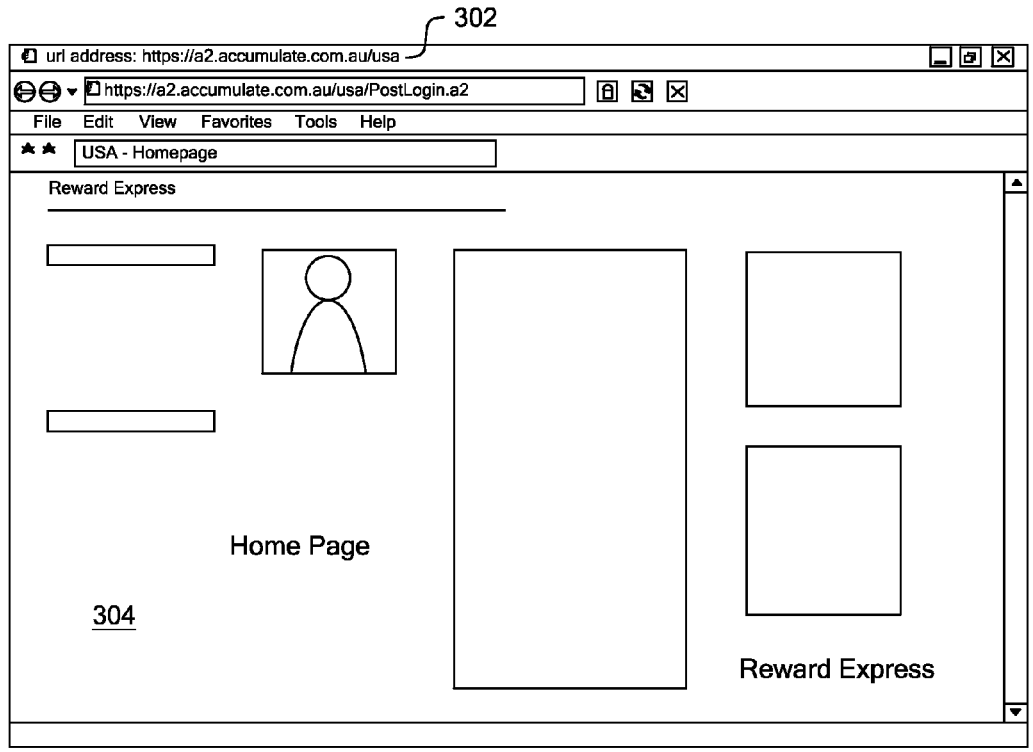
FIG. 3 illustrates a screenshot showing the home page and the content page of an original website to clone, according to an embodiment of the present invention.
Figure 3:
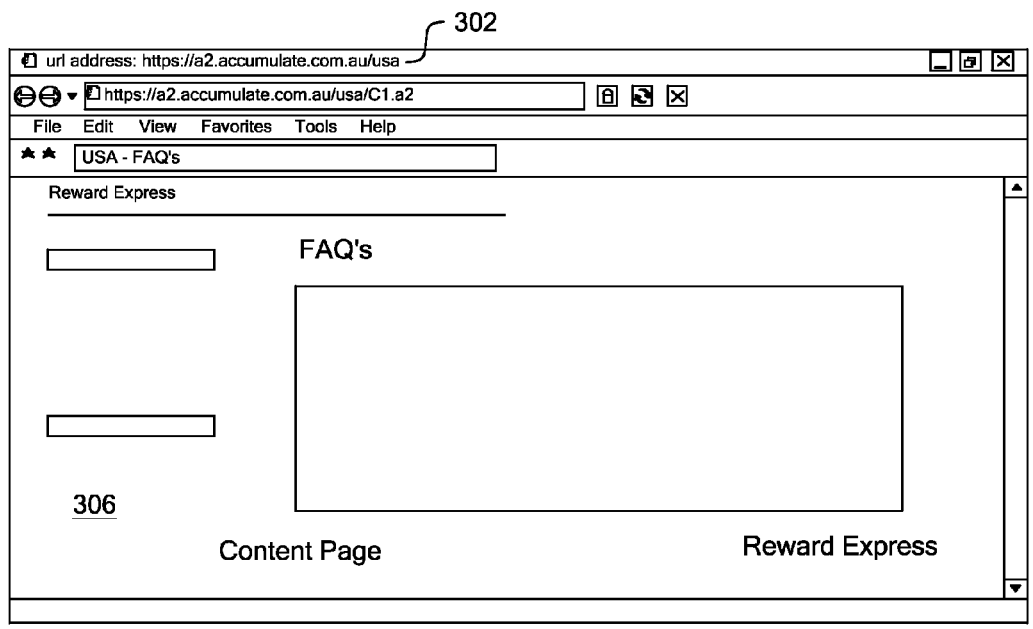
Figure 4:
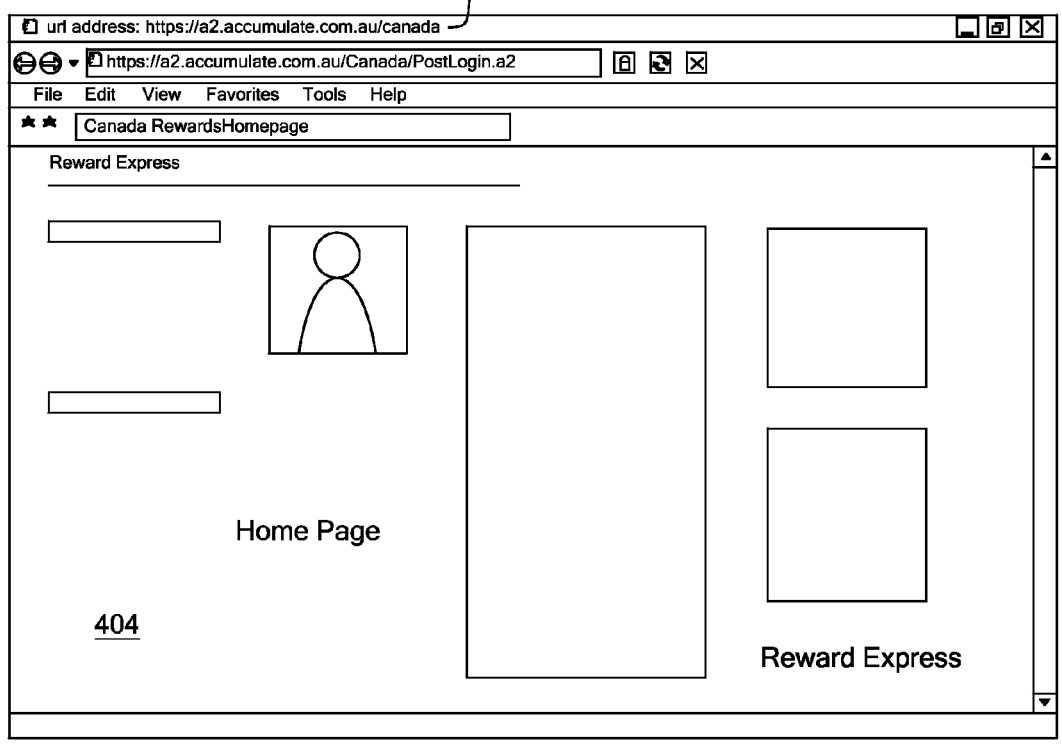
FIG. 4 illustrates a screenshot showing the home page and the content page of a cloned website, according to an embodiment of the present invention.
Figure 4:
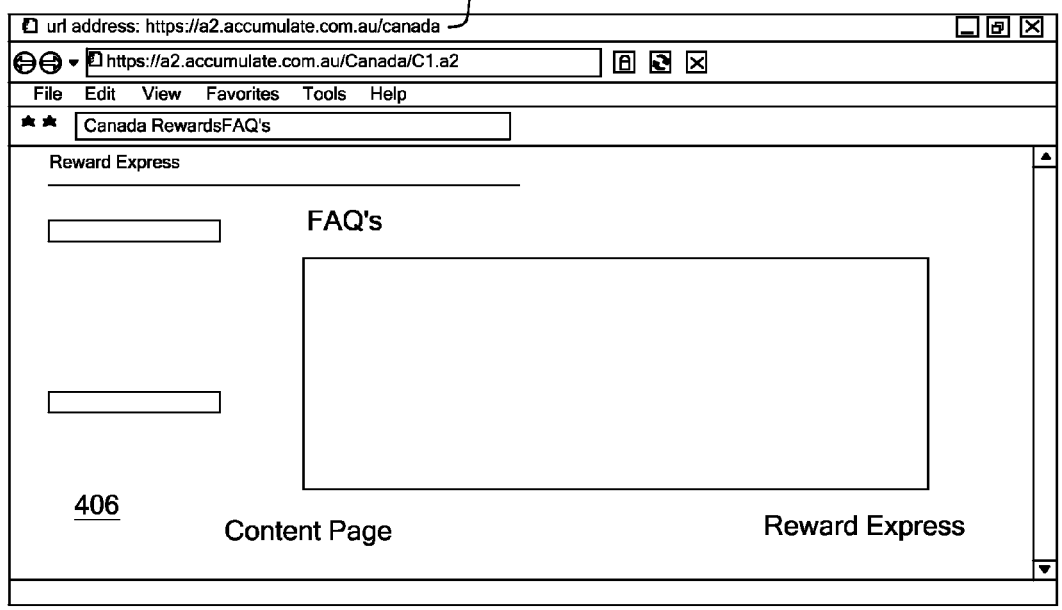

FIG. 3 illustrates a screenshot showing the home page and the content page of an original website to clone, according to an embodiment of the present invention. USA Base Page 300 is shown having USA Base Page URL 302, specifically reciting: "https://a2.accumulate.com.au/usa". USA Base Page 300 is also shown having Home Page 304 and Content Page 306, which were created by modifying specific settings and customization parameters from the application code base 122.

FIG. 4 illustrates a screenshot showing the home page and the content page of a cloned website, according to an embodiment of the present invention. Canada Clone Page 400 is a virtual site clone of USA Base Page 300, shown in FIG. 3, and is shown having Canada Clone Page URL 402, a URL specifically reciting the address "https://a2.accumulate.com/au/canada". Canada Clone Page 400 is also shown having Home Page 404 and Content Page 406, which were created by modifying specific settings and customization parameters from the UI of the Example Canada Client Site Cloning page 240, which was shown and discussed in FIG. 2B. Because Example Canada Client Site Cloning page 240 in FIG. 2 was accessed from USA Base Page 300 (via Site Cloning URL Within USA Base Page 238 and the current site URL for USA Base Page 236—same as USA Base Page URL 302—shows up in the Canada Client Site Cloning page 240), and used to create Canada Clone Page 400 (by setting the fields 202 through 230 in FIG. 2B and then pressing the Clone button 232) the Canada Clone Page 400 is a clone of the USA Base Page 300. In other words, the Canada Clone Page 400 retains the core settings and content from the USA Base Page 300, but with only minor tweaks, changes and modifications to fit the specific demands and needs of the "Canada" client. Thus, the efficiency of the customization solution inherent in the virtual site cloning process is immediately apparent, and it is clear that significant amounts of time, money and resources are saved by using the site cloning process described by embodiments of the present invention.

Figure 5:
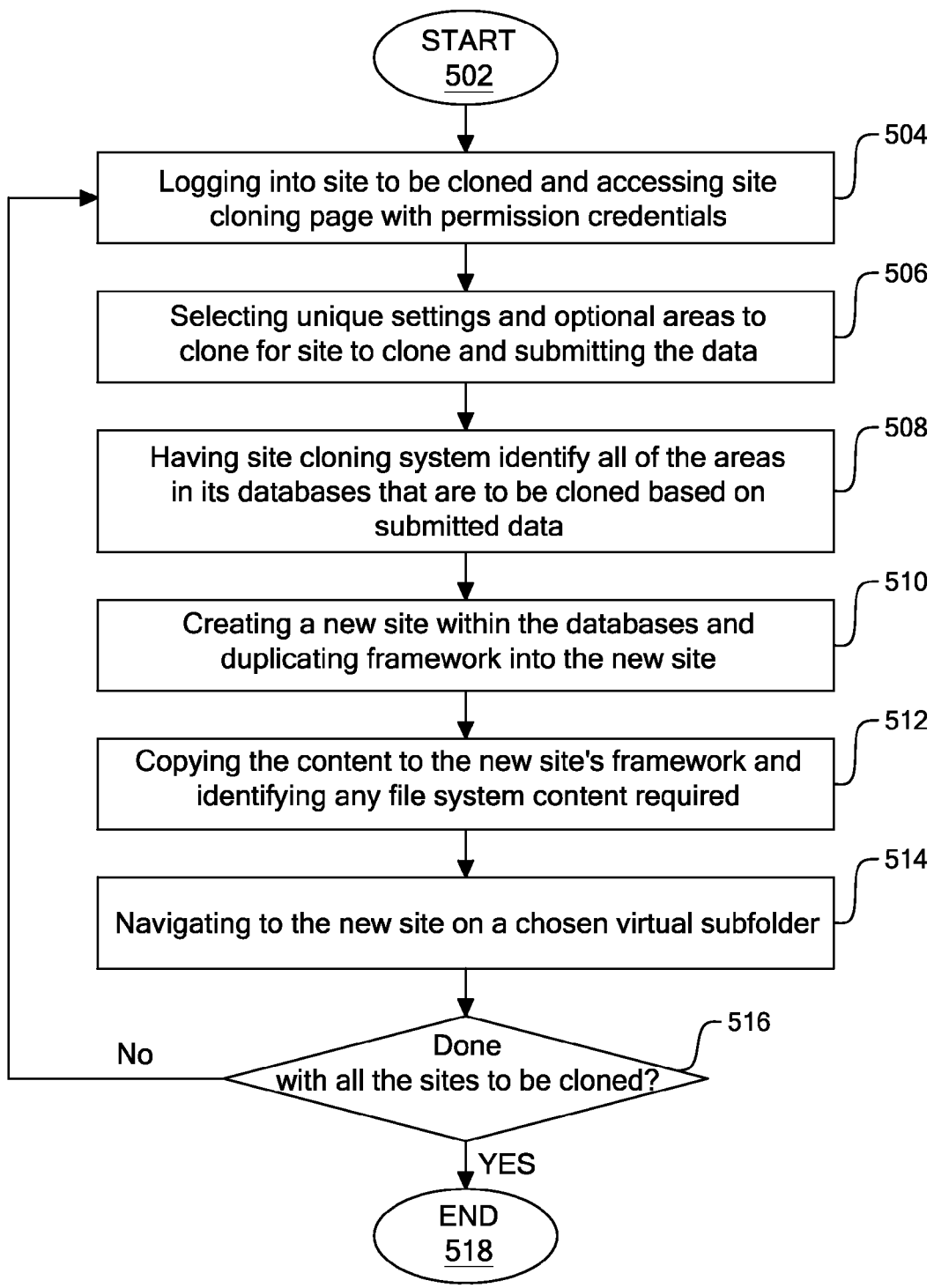
FIG. 5 illustrates a flowchart showing a method of cloning a website, according to an embodiment of the present invention.

FIG. 5 illustrates a flowchart showing a method of cloning a website, according to an embodiment of the present invention. Cloning method 500 starts in step 502. In step 504, the action of "logging into site to be cloned and accessing site cloning page with permission credentials" is performed. In other words, the site to be cloned is logged into and the site cloning page of the site to be cloned is accessed with permission credentials—such as the ones to successfully log in as "Client Services" (235 in FIG. 2A) or "Joe Client Services" (237 in FIG. 2B)—in order to access the specific site cloning page of the site to be cloned. This is shown, for example, in FIG. 2B where "Joe Client Services" (237 in FIG. 2B) is logged in to the USA Base Page 300 in FIG. 3 (shown by USA Base Page URL 302 in FIG. 3 or the URL 236 in FIG. 2B) and proceeds to the specific Site Cloning Page, shown by URL 238 in FIG. 2B, of the USA Base Page 300. Now, once logged in, "Joe Client Services" has the objective of cloning the current site (e.g. USA Base Page 300) and making it a new virtual site clone (e.g. Canada Clone Page 400).

In step 506, the step of "selecting unique settings and optional areas to clone for site to clone and submitting the data" is performed. This is shown, for example, by filling in the various fields (e.g. 202 to 230 in FIG. 2B) to chose, customize and tweak specific settings and pressing the Clone button 232 in FIG. 2B to generate a virtual site clone page, e.g. Canada Clone Page 400, off of the USA Base Page 300.

In step 508, the step of "having site cloning system identify all of the areas in its databases that are required to be cloned based on submitted data" is performed. In other words, the virtual architecture 100 in FIG. 1, working in tandem with the application code base 122 and any databases inherent in a reward and recognition portal, for example, find all the original content to-be-cloned: this original content to be cloned is usually located in the application code base 122, drawing content from any underlying databases of the application code base 122.

Then this original content is pulled and used in step 510, where the step of "creating a new site within the database and duplicating framework into the new site" is performed. Essentially, a template "shell" or foundational framework of the virtual site copy is laid into place, and any basic core foundational framework that simply needs to be duplicated in the virtual site copy from another virtual site (e.g. areas of a site, structural organization of pages within a site) would be quickly and conveniently set-up.

Then, in step 512, the step of "copying the content to the new site's framework and identifying any file system content required" is performed, which basically takes all the content located and pulled from step 508, and effectively pours that content into the template shell or foundational framework laid out in step 510. Any file system content requirements are also identified in order to ensure all the necessary content is copied over to the new virtual site copy.

In step 514, the step of "navigating to the new site on a chosen virtual subfolder" confirms the location of the virtual site copy and also verifies that the underlying structure and content has been successfully copied over.

Finally, in decision step 516, the query "done with all the sites to be cloned?" is presented. If "No" is answered to decision step 516, the method goes back to 504 in order to access another site to make yet another site clone: to illustrate with FIG. 1A, after creating Virtual Site 1a from Virtual Site 1, Virtual Site 1a would then be accessed to create Virtual Site 1b from Virtual Site 1a. If "Yes" is answered to decision step 516, then cloning method 500 comes to an end in step 518.

Thus, provided are apparatuses and methods to clone an entire website without having to replicate an entire code base and rely on bottleneck-inducing developers. The process is facilitated because it is tied to the virtual architecture of the application framework for a reward and recognition portal, thus enabling the replicating of a website with no replication of code. Also, since one common convenient application codebase is used, embodiments of the present invention do not involve replicating many code bases, and therefore an ever increasing number of codebases is not required. Thus, this enables the rapid deployment of websites or other Internet solutions using existing websites without having to use developers, which saves significant amounts of time, money and resources and is certainly a more cost-effective solution, because dependence on developers is often a huge bottleneck for businesses. Finally, a convenient and easy-to-use front end UI enables a user to clone a website with a simple click of a button after filling in a few fields. The cloning process then takes place in just a few seconds, as opposed to more than a day if a developer was hired to copy the codebase of a website from scratch. Therefore, as can be appreciated by a person skilled in the art, the site cloning process discussed in embodiments of the present invention enables the quick, convenient and cost-effective cloning of an entire website without having to replicate entire code bases or rely on developers.

The computer language code used to compose the programs to perform site cloning or any programs related to embodiments of the present invention can include, but are not limited to: Java, JavaScript, C, C++, C#, HTML, XML, Microsoft ASP.NET, Microsoft ASP.NET 2.0 with AJAX Extensions, Microsoft Web Parts and Resource Providers, T-SQL, CSS and any web-based programming language. Furthermore, for Runtime procedures, .NET2 and .NET 3.5 (SP1) may be used. Visual Studio 2005 or Visual Studio 2008 may be used for the Programming Environment and Cruise Control v.1.3.0 may be used for the Build Environment, nUnit v2.4.0 R2 may be used for Unit Testing, Microsoft IIS5.1, IIS6 may be used for the Internet Server, Visual Source Safe 2005 (v8) may be used for Source Control, and Telerik RAD Controls (on ASPNET 2008-Q2 AJAX release, or ASPNET 2007-Q2 release) may be used for Third Party Controls. Furthermore, SQL Server 2005 and Management Studio is used for SQL scripts and Internet Explorer 7-8, Firefox, Google Chrome, Opera and Safari were web browsers for displaying the websites. A variety of other software tools may also be used, such as: Microsoft Enterprise Library 3.0, MVP Pattern, Provider Pattern, Reflector (Redgate), SQL Compare v.6 (Redgate), Beyond Compare (Scooter Software), Various tools from Sysinternals (Process Explorer, File Mon, TCP View), Textpad v. 4.x, Notepad ++ v5.x, and MSDN Library.

While Site Cloning and methods and apparatuses to clone entire websites without replication of entire codebases or dependence on bottleneck-inducing developers have been described in terms of what are presently considered to be the most practical and preferred embodiments, it is to be understood that the present invention need not be limited to the above embodiments. It should also be understood that a variety of changes may be made without departing from the essence of the invention. Such changes are also implicitly included in the description. They still fall within the scope of the present invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element of the invention may be expressed by equivalent apparatus terms or method terms. Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action. Similarly, each physical element disclosed should be understood to encompass a disclosure of the action which that physical element facilitates.

An embodiment of the invention relates to a computer storage product with a computer-readable or machine-accessible medium having executable instructions or computer code thereon for performing various computer-implemented operations. The term "computer-readable medium" or "machine-accessible medium" is used herein to include any medium that is capable of storing or encoding a sequence of executable instructions or computer code for performing the operations described herein. The media and computer code can be those specially designed and constructed for the purposes of the invention, or can be of the kind well known and available to those having ordinary skill in the computer software arts.

Examples of computer-readable media include computer-readable storage media such as: magnetic media such as hard disks, floppy disks, and magnetic tape; optical media such as Compact Disc-Read Only Memories ("CD-ROMs") and holographic devices; magneto-optical media such as optical disks; and hardware devices that are specially configured to store and execute program code, such as Application-Specific Integrated Circuits ("ASICs"), Programmable Logic Devices ("PLDs"), Read Only Memory ("ROM") devices, and Random Access Memory ("RAM") devices. Examples of computer code include machine code, such as produced by a compiler, and files containing higher level code that are executed by a computer using an interpreter. For example, an embodiment of the invention may be implemented using Java, C++, or other programming language and development tools. Additional examples of computer code include encrypted code and compressed code. Another embodiment of the invention can be implemented in hard wired circuitry in place of, or in combination with, computer code.

The above is intended to cover various modifications and similar arrangements included within the spirit and scope of the below appended claims, the scope of which should be accorded the broadest interpretation so as to encompass all such modifications and similar structures and/or method steps. Therefore, the present invention includes any and all embodiments of the following below appended claims.

The invention claimed is:

1. A computer implemented method comprising:
  receiving, via a computing device, configuration data comprising unique settings and areas to clone from a site cloning page of a base site;
  pulling all content to be cloned that is located from at least one database based on the configuration data;
  creating a new site having a framework, the framework comprising site structure and being initially empty;
  copying the content from the at least one database into the framework of the new site to create a site clone of the base site customized with the configuration data; and
  verifying that the new site has become a proper site clone of the base site with the proper configuration data copied over by checking the new site on a chosen virtual sub-folder, wherein the new site verified as a proper site clone is used as another base site to create other site clones, and further wherein all the site clones share a common application code base.

2. The computer implemented method of claim 1, wherein the site cloning page of the base site is accessible only after providing valid log-in information and the site cloning page comprises a user-interface (UI) accessible via the Internet and further wherein the receiving, via a computing device, configuration data comprising unique settings and areas to clone comprises:
  receiving at least one name in at least one name field, wherein the at least one name identifies the site clone of the base site;
  receiving at least one email address in at least one email field, wherein the at least one email address is contact information for an individual responsible for the site clone of the base site; and
  receiving a site URL in a site URL field, wherein the site URL comprises at least one of a full URL and a shorthand identifier specifying a location of the site clone of the base site.

3. The computer implemented method of claim 2, wherein the receiving, via a computing device, configuration data comprising unique settings and areas to clone further comprises:
  receiving an IP address restriction in an IP address restriction field, wherein the IP address restriction restricts the IP addresses that can access the site clone of the base site;
  receiving a country code in a country field, wherein the country code identifies the country in which the site clone of the base site will be operating in;
  receiving a language-culture code in a language-culture field, wherein the language-culture code identifies the language used by the site clone of the base site;
  receiving a currency code in a currency field, wherein the currency identifies the type of currency used by the site clone of the base site; and
  receiving a time zone in a time zone field, wherein the time zone identifies the specific time zone used by the site clone of the base site.

4. The computer implemented method of claim 2, wherein the receiving, via a computing device, configuration data comprising unique settings and areas to clone further comprises:
  receiving a program name in a program name field, wherein the program name comprises the name of the reward and recognition program for which a reward and recognition portal is being used;
  receiving a corporate account identifier in a corporate account field, the corporate account identifier identifying the name of a corporate account used in the reward and recognition portal associated with the site clone of the base site;
  receiving a site timeout value in a site timeout field, the site timeout field specifying the amount of time to wait before logging a user out of the site clone of the base site, wherein the user is logged in to a reward and recognition portal through the site clone of the base site and further wherein the amount of time comprises seconds, minutes and hours; and receiving a contract signed verification, wherein the contract signed verification enables a user using the reward and recognition portal to activate a site based on whether a contract has been signed with the client who intends to use the site.

5. The computer implemented method of claim 1, wherein the copying the pulled content from the at least one database into the framework of the new site comprises:

identifying any file system content required for the new site; and obtaining the required file system content to copy into the framework of the new site.

6. The computer implemented method of claim 1, wherein the common application code base is stored on the at least one database, and comprises:

a site zero containing a basic website template with default settings;

a virtual architecture that comprises at least one layer; and code to perform functions pertaining to a reward and recognition application.

7. A non-transitory computer readable storage medium storing computer-readable instructions which when executed, cause a system to perform a method:

receiving configuration data comprising unique settings and areas to clone from a site cloning page of a base site;

pulling all content to be cloned that is located from at least one database based on the configuration data;

creating a new site having a framework, the framework comprising site structure and being initially empty;

copying the content from the at least one database into the framework of the new site to create a site clone of the base site customized with the configuration data; and verifying that the new site has become a proper site clone of the base site with the proper configuration data copied over by checking the new site on a chosen virtual subfolder, wherein the new site verified as a proper site clone is used as another base site to create other site clones, and further wherein all the site clones share a common application code base.

8. The non-transitory computer readable storage medium of claim 7, wherein the site cloning page of the base site is accessible only after providing valid log-in information and the site cloning page comprises a user-interface (UI) accessible via the Internet and further wherein the receiving configuration data comprising unique settings and areas to clone comprises:

receiving at least one name in at least one name field, wherein the at least one name identifies the site clone of the base site;

receiving at least one email address in at least one email field, wherein the at least one email address is contact information for an individual responsible for the site clone of the base site; and receiving a site URL in a site URL field, wherein the site URL comprises at least one of a full URL and a shorthand identifier specifying the location of the site clone of the base site.

9. The non-transitory computer readable storage medium of claim 8, wherein the receiving configuration data comprising unique settings and areas to clone further comprises:

receiving an IP address restriction in an IP address restriction field, wherein the IP address restriction restricts the IP addresses that can access the site clone of the base site;

receiving a country code in a country field, wherein the country code identifies the country in which the site clone of the base site will be operating in;

receiving a language-culture code in a language-culture field, wherein the language-culture code identifies the language used by the site clone of the base site;

receiving a currency code in a currency field, wherein the currency identifies the type of currency used by the site clone of the base site; and receiving a time zone in a time zone field, wherein the time zone identifies the specific time zone used by the site clone of the base site.

10. The non-transitory computer readable storage medium of claim 8, wherein the receiving configuration data comprising unique settings and areas to clone further comprises:

receiving a program name in a program name field, wherein the program name comprises the name of the reward and recognition program for which a reward and recognition portal is being used;

receiving a corporate account identifier in a corporate account field, the corporate account identifier identifying the name of a corporate account used in the reward and recognition portal associated with the site clone of the base site;

receiving a site timeout value in a site timeout field, the site timeout field specifying the amount of time to wait before logging a user out of the site clone of the base site, wherein the user is logged in to a reward and recognition portal through the site clone of the base site and further wherein the amount of time comprises seconds, minutes and hours; and receiving a contract signed verification, wherein the contract signed verification enables a user using the reward and recognition portal to activate a site based on whether a contract has been signed with the client who intends to use the site.

11. The non-transitory computer readable storage medium of claim 7, wherein the copying the pulled content from the at least one database into the framework of the new site comprises:

identifying any file system content required for the new site; and obtaining the required file system content to copy into the framework of the new site.

12. A computer system comprising at least one server configured for:

receiving configuration data comprising unique settings and areas to clone from a site cloning page of a base site;

pulling all content to be cloned that is located from at least one database based on the configuration data;

creating a new site having a framework, the framework comprising site structure and being initially empty;

copying the content from the at least one database into the framework of the new site to create a site clone of the base site customized with configuration data; and verifying that the new site has become a proper site clone of the base site with the proper configuration data copied over by checking the new site on a chosen virtual subfolder, wherein the new site verified as a proper site clone is used as another base site to create other site clones, and further wherein all the site clones share a common application code base.

13. The computer system of claim 12, wherein the site cloning page of the base site is accessible only after providing valid log-in information and the site cloning page comprises a user-interface (UI) accessible via the Internet and further wherein the receiving configuration data comprising unique settings and areas to clone comprises:

receiving at least one name in at least one name field, wherein the at least one name identifies the site clone of the base site;

receiving at least one email address in at least one email field, wherein the at least one email address is the contact information for an individual responsible for the site clone of the base site; and receiving a site URL in a site URL field, wherein the site URL comprises at least one of a full URL and a shorthand identifier specifying the location of the site clone of the base site.

14. The computer system of claim 13, wherein the receiving configuration data comprising unique settings and areas to clone further comprises:

receiving an IP address restriction in an IP address restriction field, wherein the IP address restriction restricts the IP addresses that can access the site clone of the base site;

receiving a country code in a country field, wherein the country code identifies the country in which the site clone of the base site will be operating in;

receiving a language-culture code in a language or cultureID field, wherein the language-culture code identifies the language used by the site clone of the base site;

receiving a currency code in a currency field, wherein the currency identifies the type of currency used by the site clone of the base site; and receiving a time zone in a time zone field, wherein the time zone identifies the specific time zone used by the site clone of the base site.

15. The computer system of claim 13, wherein the receiving configuration data comprising unique settings and areas to clone further comprises:

receiving a program name in a program name field, wherein the program name comprises the name of the reward and recognition program for which a reward and recognition portal is used;

receiving a corporate account identifier in a corporate account field, the corporate account identifier identifying the name of a corporate account used in the reward and recognition portal associated with the site clone of the base site;

receiving a site timeout value in a site timeout field, the site timeout field specifying the amount of time to wait before logging a user out of the site clone of the base site, wherein the user is logged in to a reward and recognition portal through the site clone of the base site and further wherein the amount of time comprises seconds, minutes and hours; and receiving a contract signed verification, wherein the contract signed verification enables a user using the reward and recognition portal to activate a site based on whether a contract has been signed with the client who intends to use the site.

16. The computer system of claim 12, wherein the copying the pulled content from the at least one database into the framework of the new site comprises:

identifying any file system content required for the new site; and obtaining the required file system content to copy into the framework of the new site.

17. A computer implemented method comprising:

receiving, via a computing device, configuration data comprising unique settings and areas to clone from a site cloning page of a base site, wherein the site cloning page of the base site is accessible only after providing valid log-in information and the site cloning page comprises a user-interface (UI) accessible via the Internet and wherein the receiving of the configuration data comprising unique settings and areas to clone comprises:

receiving at least one name in at least one name field, wherein the at least one name identifies the site clone of the base site;

receiving at least one email address in at least one email field, wherein the at least one email address is contact information for an individual responsible for the site clone of the base site;

receiving a site URL in a site URL field, wherein the site URL comprises at least one of a full URL and a shorthand identifier specifying a location of the site clone of the base site;

receiving the name of a reward and recognition program for which a reward and recognition portal is being used;

receiving a corporate account identifier in a corporate account field, the corporate account identifier identifying the name of a corporate account used in the reward and recognition portal associated with the site clone of the base site;

receiving a site timeout value in a site timeout field, the site timeout field specifying the amount of time to wait before logging a user out of the site clone of the base site, wherein the user is logged in to a reward and recognition portal through the site clone of the base site and further wherein the amount of time comprises seconds, minutes and hours;

receiving a contract signed verification, wherein the contract signed verification enables a user using the reward and recognition portal to activate a site based on whether a contract has been signed with the client who intends to use the site;

pulling all content to be cloned that is located from at least one database based on the configuration data;

creating a new site having a framework, the framework comprising site structure and being initially empty; and copying the content from the at least one database into the framework of the new site to create a site clone of the base site customized with the configuration data.

18. A non-transitory computer readable storage medium storing computer-readable instructions which when executed, cause a system to perform a method:

receiving configuration data comprising unique settings and areas to clone from a site cloning page of a base site, wherein the site cloning page of the base site is accessible only after providing valid log-in information and the site cloning page comprises a user-interface (UI) accessible via the Internet and wherein the receiving of the configuration data comprising unique settings and areas to clone comprises:

receiving at least one name in at least one name field, wherein the at least one name identifies the site clone of the base site;

receiving at least one email address in at least one email field, wherein the at least one email address is contact information for an individual responsible for the site clone of the base site;

receiving a site URL in a site URL field, wherein the site URL comprises at least one of a full URL and a shorthand identifier specifying a location of the site clone of the base site;

receiving the name of a reward and recognition program for which a reward and recognition portal is being used;

receiving a corporate account identifier in a corporate account field, the corporate account identifier identifying the name of a corporate account used in the reward and recognition portal associated with the site clone of the base site;

receiving a site timeout value in a site timeout field, the site timeout field specifying the amount of time to wait before logging a user out of the site clone of the base site, wherein the user is logged in to a reward and recognition portal through the site clone of the base site and further wherein the amount of time comprises seconds, minutes and hours;

receiving a contract signed verification, wherein the contract signed verification enables a user using the reward and recognition portal to activate a site based on whether a contract has been signed with the client who intends to use the site;

pulling all content to be cloned that is located from at least one database based on the configuration data;

creating a new site having a framework, the framework comprising site structure and being initially empty; and copying the content from the at least one database into the framework of the new site to create a site clone of the base site customized with the configuration data.

19. A computer system comprising at least one server configured for:

receiving configuration data comprising unique settings and areas to clone from a site cloning page of a base site, wherein the site cloning page of the base site is accessible only after providing valid log-in information and the site cloning page comprises a user-interface (UI) accessible via the Internet and wherein the receiving of the configuration data comprising unique settings and areas to clone comprises:

receiving at least one name in at least one name field, wherein the at least one name identifies the site clone of the base site;

receiving at least one email address in at least one email field, wherein the at least one email address is contact information for an individual responsible for the site clone of the base site;

receiving a site URL in a site URL field, wherein the site URL comprises at least one of a full URL and a shorthand identifier specifying a location of the site clone of the base site;

receiving the name of a reward and recognition program for which a reward and recognition portal is being used;

receiving a corporate account identifier in a corporate account field, the corporate account identifier identifying the name of a corporate account used in the reward and recognition portal associated with the site clone of the base site;

receiving a site timeout value in a site timeout field, the site timeout field specifying the amount of time to wait before logging a user out of the site clone of the base site, wherein the user is logged in to a reward and recognition portal through the site clone of the base site and further wherein the amount of time comprises seconds, minutes and hours;

receiving a contract signed verification, wherein the contract signed verification enables a user using the reward and recognition portal to activate a site based on whether a contract has been signed with the client who intends to use the site;

pulling all content to be cloned that is located from at least one database based on the configuration data;

creating a new site having a framework, the framework comprising site structure and being initially empty; and copying the content from the at least one database into the framework of the new site to create a site clone of the base site customized with the configuration data.

* * * * *